United States Patent [19]

Tanahashi et al.

[11] Patent Number: 5,432,635
[45] Date of Patent: Jul. 11, 1995

[54] NONLINEAR OPTICAL MATERIAL AND METHOD OF MANUFACTURING THE SAME

[75] Inventors: Ichiro Tanahashi, Hirakata; Masaru Yoshida, Katano; Tsuneo Misuyu, Hirakata, all of Japan

[73] Assignee: Matsushita Electric Industrial Co., Ltd., Osaka, Japan

[21] Appl. No.: 125,213

[22] Filed: Sep. 23, 1993

[30] Foreign Application Priority Data

Sep. 29, 1992 [JP] Japan .................. 4-259450
Sep. 29, 1992 [JP] Japan .................. 4-259451

[51] Int. Cl.⁶ .............................. G02F 1/35
[52] U.S. Cl. ........................... 359/326; 252/582; 501/12; 501/32; 501/72
[58] Field of Search ............... 359/326–332; 385/122, 141, 142, 143; 65/33; 252/512, 514, 518, 582; 501/11, 12, 17, 19, 32, 49, 65, 72

[56] References Cited

U.S. PATENT DOCUMENTS

| | | | |
|---|---|---|---|
| 5,091,115 | 2/1992 | Nogami | 252/518 |
| 5,093,286 | 3/1992 | Nogami et al. | 501/17 |
| 5,122,178 | 6/1992 | Omi et al. | 65/33 |
| 5,215,820 | 6/1993 | Hosokawa et al. | 428/403 |

FOREIGN PATENT DOCUMENTS 1-239535 9/1989 Japan .
2-230223 9/1990 Japan .

*Primary Examiner*—John D. Lee
*Attorney, Agent, or Firm*—Fish & Richardson

[57] ABSTRACT

A nonlinear optical material which exhibits large third order nonlinear optical susceptibilities, and responds to light with wavelengths different from each other for multiple signal processing, and methods of manufacturing the same. This is accomplished by dispersing a high concentration of a metal fine particle and/or a semiconductor fine particle different in absorption wavelength throughout an optically transparent matrix such as a glass, a ceramic or a polymer.

19 Claims, 3 Drawing Sheets

NONLINEAR OPTICAL MATERIAL AND METHOD OF MANUFACTURING THE SAME

FIELD OF THE INVENTION

This invention relates to a nonlinear optical material for optical devices having a third order nonlinear optical effect, and methods of manufacturing the same.

BACKGROUND OF THE INVENTION

Nonlinear optical materials have recently been considered for use with optical devices such as a high-speed optical switch or a high frequency generator. In particular, those materials formed of a metal fine particle, a semiconductor fine particle or organic compounds having a nonlinear optical property, and a manufacturing method therefore have received attention in developing high-performance materials.

Conventional methods in this technical field include production of metal fine particle-dispersed glasses by a melt-quenching method (Appl. Phys. A., Vol. 47 (1988), p. 347). The method is based on a melt-quenching method, similar to a conventional method for filter-glasses, in which gold melted in a glass matrix is subjected to heat to precipitate gold fine particles.

Methods for producing gold colloid are also known (J. Opt. Soc. Am. B, Vol. 7 (1990), p. 790). In this method colloidal gold is formed from a reducing agent and a 0.01% aqueous solution of chloroauric acid.

A method for producing a metal fine particle-doped matrix is also known (Japanese Unexamined Patent Publication No. HEI-239535). This method includes two different ways in which a metal fine particle produced from light irradiation and/or heat treatment is doped in a matrix, and a metal fine particle-producing compound is doped in a matrix.

The use of cut-off filter glasses formed of borosilicate glass and $CdS_xSe_{1-x}$ dispersed therein is also disclosed (J. Opt. Soc. Am. B, Vol. 73 (1983), p. 647). The cut-off filter glass is made by melting a mixture of $CdS_xSe_{1-x}$ and raw materials for making borosilicate glasses in a platinum crucible at about 1000° C.

The above methods of manufacturing nonlinear optical materials comprising a metal or semiconductor fine particle have the following problems.

(1) The metal fine particle-dispersed glass

The melt-quenching method restricts the kinds of metals available for use. Further, at most, only about $10^{-6}$ to $10^{-5}$ vol. % of the metal can be dispersed since the solubility of metal to glass is low.

High temperatures of 1000° C. or more are needed to precipitate a fine particle from the metal dispersed in the glass.

A glass containing one kind of metal element permits an optical signal process at the wavelength of the plasmon absorption band other metal. Thus, the glass does not permit a multiple signal process.

(2) The gold colloid

It is difficult to increase the concentration of gold colloid. When the concentration of gold colloid increases more than $10^{-6}$ vol. %, the colloid begins to cohere. Even when the concentration becomes low, the colloid is less stable for long time use. With time, the composition of the solution gradually changes, or the particle diameter of the colloid increases. Further, as stated above, a glass containing one kind of metal element permits an optical signal process at the wavelength of the plasmon absorption band of the metal. Thus, the glass does not permit a multiple signal process.

(3) The semiconductor fine particle-dispersed glass

By the melt-quenching method, a part of the semiconductor components evaporates in the melting process, which changes the composition of the semiconductor. With a glass containing just one kind of a semiconductor, the third order nonlinear optical effect appears, allowing an optical signal process only when the glass absorbs light having a wavelength in the band gap of the semiconductor. In addition, the glass does not permit multiple signal processing.

(4) Production of a metal fine particle by light irradiation and/or heat treatment Light irradiation provides insufficient reduction, and it restricts the kinds of compounds used to provide the intended metal fine particle. With use of heating and light irradiation, the fine particle which was produced by the irradiation grows, and the mean particle diameter and the deviation increase.

SUMMARY OF THE INVENTION

An object of the invention is to provide a nonlinear optical material which exhibits large third order nonlinear optical susceptibilities, and which responds to light with wavelengths different from each other for multiple signal processing. This object is accomplished by dispersing a metal fine particle and/or a semiconductor fine particle different in absorption wavelength throughout a glass matrix, a ceramic matrix or a polymer matrix.

A further object of this invention is to provide a nonlinear optical material which exhibits large third order nonlinear optical susceptibilities by dispersing a high concentration of a metal fine particle in a gel matrix.

The objects of the invention are achieved by providing a nonlinear optical material comprising an optically transparent matrix and at least two kinds of fine particles dispersed therein. The optically transparent matrix has no photo-absorption in the wavelength region of photo-absorption of the fine particles. The fine particles each are a metal fine particle or a semiconductor fine particle in order to exhibit a third order nonlinear optical effect upon absorption of light having different wavelengths. Use of different kinds of fine particles whose photo-absorption wavelengths are different from each other provides a nonlinear optical material having a large third order nonlinear optical susceptibility and being capable of responding to light having different wavelengths, that is, a multiple signal process.

It is preferable in the invention that the metal fine particle is made of at least one element selected from the group consisting of gold, platinum, silver, copper, rhodium, palladium and iridium. These metals are less influenced by impurities such as oxygen than other metals. Metal fine particles precipitated from these metals are relatively pure, thereby providing a nonlinear optical material having a large third order nonlinear optical property.

It is also preferable in the invention that the semiconductor fine particle is made of at least one compound selected from the group consisting of ZnS, CdS, ZnSe, CdSe, PbS and CuCl. Such semiconductors are easier to form fine particles in a matrix than other semiconductors, thereby providing a nonlinear optical material having a large third order nonlinear optical property.

It is also preferable in the invention that the optically transparent matrix is made of inorganic glass or ceramic. Inorganic glass and ceramic are optically transparent over a wide wavelength range, which provides a nonlinear optical material having a large third order nonlinear optical property.

It is also preferable in the invention that the optically transparent matrix is made of at least one polymer selected from the group consisting of polystyrene, polyethylene and acrylonitrile-styrene copolymer. These polymers are useful in making the nonlinear optical material because they are easy to form into a thin film which is a preferred mode for a nonlinear optical material.

The invention also provides methods of manufacturing a nonlinear optical material.

A first method of the invention comprises the steps of mixing a component for producing borosilicate glass with two kinds of materials each being a semiconductor or a combination of a metal compound and a reducing agent, melting, quenching rapidly and heating the mixture. This method permits many kinds of metal compounds and/or semiconductors to be dispersed uniformly in a matrix at the material preparation stage. Further, the method readily provides a nonlinear optical material having a large nonlinear optical property and being capable of responding to light having different wavelengths, that is, a multiple signal process.

A second method of the invention comprises the steps of mixing a solution of an alkoxide with at least two metal ions, gelling the mixture, and subjecting the mixture to reduction to form a metal fine particle and treatment with $H_2S$ or $H_2Se$ to form a semiconductor fine particle. The second method permits many kinds of semiconductor fine particles to be dispersed uniformly in a matrix. Further, the method readily provides a nonlinear optical material having a large nonlinear optical property and being capable of responding to light having different wavelengths, that is, a multiple signal process.

It is preferable in the invention that the mixture is reduced by heating to form a metal fine particle, because many kinds of metal fine particles are uniformly dispersed in a matrix. This provides a nonlinear optical material having a large nonlinear optical property and being capable of responding to light having different wavelengths, that is, a multiple signal process.

It is also preferable in the invention that the mixture is photoreduced by light irradiation and treated with an alcohol to form a metal fine particle. That is because metal ions are readily reduced to metal fine particles, which provides a nonlinear optical material having a large nonlinear optical property.

It is also preferable in the invention that the mixture is photoreduced by light irradiation and treated with both an alcohol and $Ce^{3+}$ to form a metal fine particle. $Ce^{3+}$ releases an electron upon light irradiation to become $Ce^{4+}$, and the electron facilitates the reduction of metal ions to metal fine particles. Metal fine particles are thus precipitated quickly and effectively.

It is also preferable in the invention that the mixture is photoreduced by light irradiation and treated with an alcohol to form a metal fine particle and then reacted with $H_2S$ or $H_2Se$ to form a semiconductor fine particle.

It is also preferable in the invention that light having a wavelength of 400 nm or less is used to irradiate, because such light effectively reduces metal salts to metal fine particles.

A third method of the invention comprises the steps of mixing a polymer with two kinds of metal ions, gelling the mixture, subjecting the mixture to reduction and treatment with $H_2S$ or $H_2Se$ to form a semiconductor fine particle and metal fine particle. The third method also permits many kinds of fine particles to uniformly be dispersed in a polymer matrix.

It is preferable in the invention that the mixture is reduced by heating to form a metal fine particle. That is because many kinds of metal fine particles are uniformly dispersed in a polymer matrix.

It is also preferable in the invention that the mixture is reduced by heating to form a metal fine particle and reacted with $H_2S$ or $H_2Se$ to form a semiconductor fine particle, because many kinds of metal fine particles and semiconductor fine particles are uniformly dispersed in a polymer matrix.

DETAILED DESCRIPTION OF THE INVENTION

Figure 1:
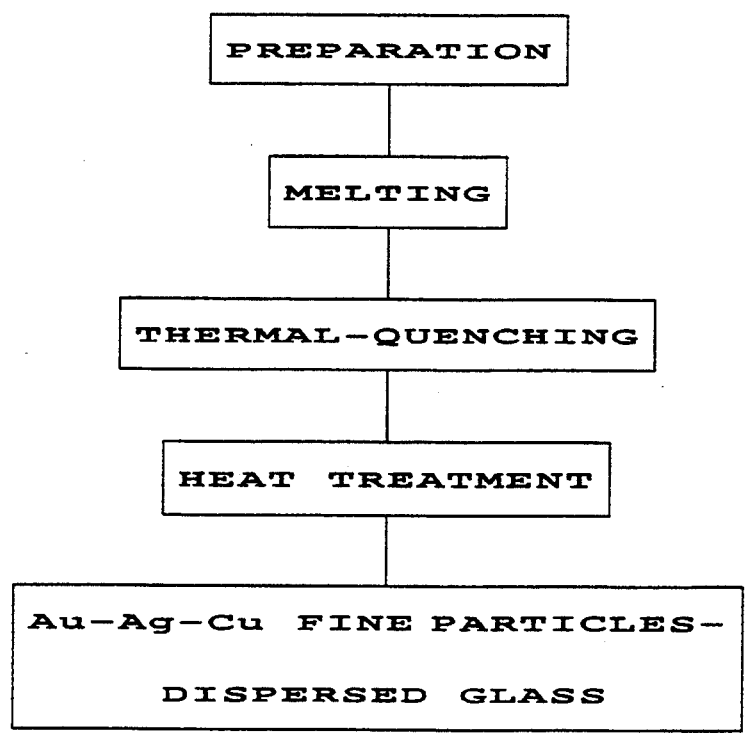
FIG. 1 shows each step of an embodiment of a method for manufacturing a nonlinear optical material.

The melt-quenching method of the invention provides a matrix at relatively low temperatures. The matrix is preferably made of borosilicate glass, which is chemically stable and optically transparent over a wide range of wavelengths.

A matrix is made by a sol-gel method, preferably using $SiO_2$ or $Al_2O_3$, which are chemically stable and optically transparent over a wide range of wavelengths. The sol-gel method includes hydrolysis of a lower alkoxide sol to gel, and heating the lower alkoxide gel to form glass or ceramic.

Examples of typical alkoxides include silicon lower alkoxides such as silicon methoxide or silicon methoxide, aluminum lower alkoxides such as aluminum methoxide or aluminum methoxide.

Examples of dispersion mediums for sol include water, methanol, ethanol, propanol and ethylene glycol. These media are usually hydrolyzed together with a catalyst such as hydrochloric acid or ammonia.

Formamide or N,N-dimethylformamide is preferably used as a drying control chemical additive for preventing a gel from cracking or foaming during drying.

In the invention, the metal fine particle-forming sol containing a metal salt is usually gelled at temperatures from room temperature to 100° C.

After gelling a sol material, the resultant gel is heated usually at 300° to 800° C. It is preferably heated at 300° to 500° C. to remove residual organic substances in the matrix and heated again at 300° to 900° C. to grow a metal or semiconductor fine particle.

Polystyrene, polyethylene and acrylonitrile-styrene copolymer, which are easy to mold to a film, are suitable for a matrix. Other transparent polymers which can be molded to a film, such as polypropylene, polyester, polyamide or poly(methyl methacrylate), are also used. A metal fine particle can be dispersed in a polymer matrix using a solvent or by a thermal-fusing method in which the metal is dispersed at the fusion temperature of the polymer.

A metal fine particle is preferably made of a metal which exhibits a third order nonlinear optical property based on surface plasma absorption or quantum size effect. Examples include gold, platinum, silver, copper, rhodium, palladium and iridium.

A semiconductor fine particle is preferably made of a semiconductor which exhibits a large third order nonlinear optical property based on quantum size effect. Suitable examples include ZnS, CdS, ZnSe, CdSe, PbS and CuCl.

Examples of metal ion-producing compounds of Zn, Cd or Pb include $ZnCl_2$, $ZnCO_3$, $Zn(NO_3)_2$, $Zn(CH_3COO)_2$, $Zn(HCOO)_2$, $CdCl_2$, $CdCO_3$, $Cd(NO_3)_2$, $Cd(CH_3COO)_2$, $Cd(HCOO)_2$, $PbCl_2$, $PbCO_3$, $Pb(NO_3)_2$ and $Pb(CH_3COO)_2$. Metal ions of Zn, Cd or Pb are reacted with $H_2S$ or $H_2Se$ gas to form ZnS, CdS, ZnSe, CdSe or PbS, preferably at a temperature of 50° to 300° C.

Preferable examples of metal compounds to be reduced to metal fine particles in a sol include $AuHCl_4$, $PtCl_2$, $AgCl$, $CuO_2$, $RhCl_3$, $PdCl_2$ and $IrCl_3$. The reduction process is preferably done by heating or using a reducing agent such as $CeO_2$, $SnO_2$ or $NaBH_4$.

Preferable examples of metal salts to be photoreduced to metal fine particles in a sol are $AuHCl_4$, $AuNaCl_4$, $H_2PtCl_6$, $AgClO_4$, $RhCl_3$ and $PdCl_2$. Suitable reducing agents include methanol, ethanol, propanol, ethylene glycol and $Ce(NO_3)_3(Ce^{3+})$, which also work as solvents in an alkoxide.

Light irradiation is usually performed after the gelling process, though it can be performed on a sol material. This process is preferably done in the presence of an alcohol even though the gelling process reduces a considerable amount of the alcohol due to evaporation or the like. With too little amount of alcohol, it takes a long time to reduce the metal ions. Equimolar or more amounts of the alcohol to the metal ion, or ethylene glycol having a high boiling point is preferable. Use of equimolar or less of $Ce^{3+}$ to the metal ion is also preferable. Too much amount of $Ce^{3+}$ absorbs light and colors the gel.

All compounds for producing metal fine particles upon reduction, all metal ions for producing semiconductor compounds upon reaction with $H_2S$ or $H_2Se$ gas, and the reducing agents are similarly applied to the methods of the invention using borosilicate glass or a polymer.

The at least two kinds of fine particles can consist of metal fine particles alone, semiconductor fine particles alone, or a metal fine particle and a semiconductor fine particle in combination.

The ratio of fine particles can be set freely depending on purpose although too little amount of a component deteriorates the nature of the final product. About an equal amount of each fine particle is usually used. For example, a preferable ratio of fine particles is one in which a device composed of the final product, such as an optical bistable device, operates at each absorption wavelength of the particles.

The total amount of the fine particles to be dispersed in the matrix is usually 0.01 to 50 wt %, preferably 0.1 to 10 wt % although it is not restricted. Too little amount of them impairs the nonlinear optical property, and on the contrary, too much amount of them makes optical absorption too large, or readily causes the particles to aggregate.

Preferred embodiments will be described below with reference to the following examples.

EXAMPLES

Example 1

Figure 2:
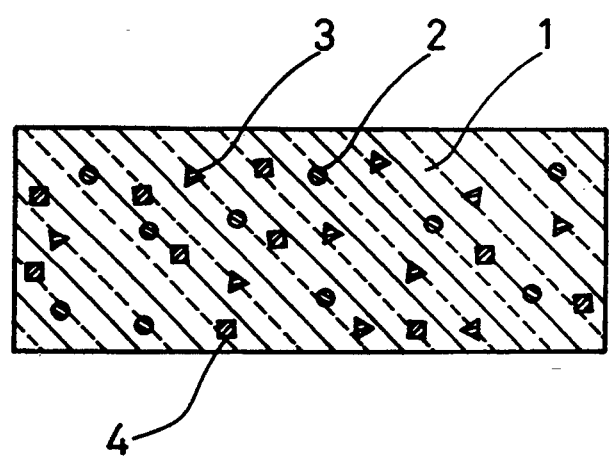
FIG. 2 is a schematic sectional view of a glass prepared in an embodiment of the invention.
Figure 3:
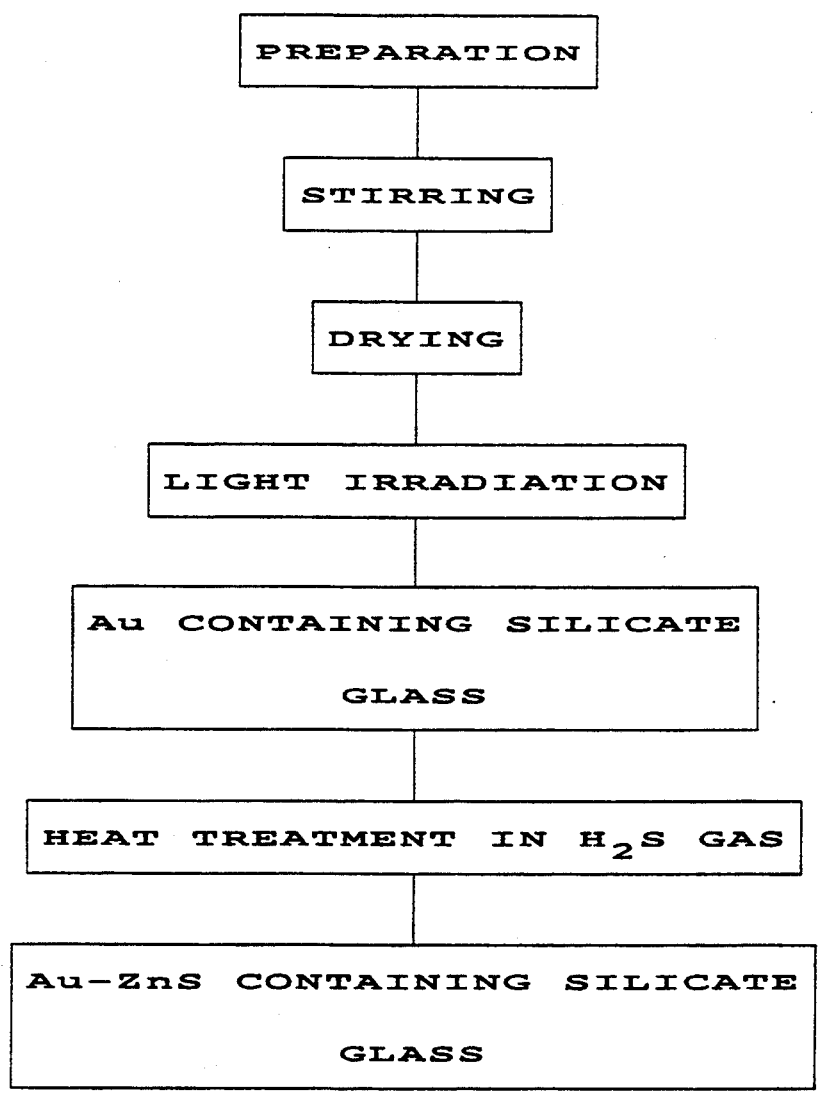
FIG. 3 shows each step of another embodiment of a method for manufacturing a nonlinear optical material.

Starting materials consisting of 75 mole parts $SiO_2$, 10 mole parts $Na_2O$, 15 mole parts $B_2O_3$, 1 mole part $AuCl_3$, 1 mole part AgCl, 1 mole part $Cu_2O$ and 2 mole parts SnO in a platinum crucible were melted in air for 1 hour at 1300° C. The melted material was flowed over a stainless steel plate, and was thermally quenched and vitrified. The material was then heated for 5 hr at 450° C. and gradually cooled to precipitate metal fine particles and to eliminate strains from the resulting glass. As shown in FIG. 2, borosilicate glass matrix 1 comprises Au fine particle 2, Ag fine particle 3 and Cu fine particle 4 uniformly dispersed therein. The borosilicate glass matrix 1 exhibited absorption spectrum peaks at 525 nm, 400 nm and 575 nm, which were due to a respective surface plasmon absorption of Au fine particle 2, Ag fine particle 3 and Cu fine particle 4. The third order nonlinear optical susceptibilities measured by the forward degenerate four-wave mixing method were $1 \times 10^{-7}$ to $8 \times 10^{-7}$ esu at each surface plasmon absorption. Borosilicate glasses were similarly formed using various combinations of two or three fine particles selected from gold, platinum, silver, copper, rhodium, palladium and iridium. Surface plasmon absorption of each metal fine particle was confirmed. The third order nonlinear optical susceptibilities thereof were from $10^{-8}$ to $10^{-7}$ esu.

Example 2

Starting materials consisting of 75 mole parts $SiO_2$, 10 mole parts $Na_2O$, 15 mole parts $B_2O_3$, 1 mole part $AuCl_3$, 1 mole part AgCl, 1 mole part CdSe, 1 mole part CdTe, 1 mole part CuCl and 2 mole parts SnO in a platinum melting pot were fused in air for 1 hour at 1300° C. The fused material was flowed over a stainless steel plate, and was thermally quenched and vitrified. The material was then heated for 5 hr at 430° C. and gradually cooled to precipitate metal fine particles and semiconductor fine particles and to eliminate strains from the resulting glass. A borosilicate glass comprising fine particles of Au, Ag, CdSe, CdTe and CuCl dispersed therein was thus formed. In the absorption spectrum of the borosilicate glass, the peaks appeared at 525 nm and 400 nm, which were due to a respective surface plasmon absorption of Au fine particle and Ag fine particle. The third order nonlinear optical susceptibilities measured by the forward degenerate four-wave mixing method were $1 \times 10^{-7}$ to $8 \times 10^{-7}$ esu at each surface plasmon absorption. Photo-absorption peaks due to the subbands of CdSe, CdTe and CuCl fine particles appeared at 650 nm, 760 nm and 420 nm, respectively. The third order nonlinear optical susceptibilities measured by the forward degenerate four-wave mixing method were $6 \times 10^{-7}$ to $15 \times 10^{-7}$ esu at each surface plasmon absorption.

Borosilicate glasses were similarly formed using various combinations of fine particles selected from gold, platinum, silver, copper, rhodium, palladium, iridium, ZnS, CdS, ZnSe, CdSe, PbS and CuCl (6 kinds at most). Surface plasmon absorption of each metal fine particle and semiconductor fine particle was confirmed. The third order nonlinear optical susceptibilities thereof were from $10^{-8}$ to $10^{-6}$ esu.

Example 3

A solution of $Zn(NO_3)_2$, $Cd(NO_3)_2$ and $Pb(NO_3)_2$ in water was added to a sol whose composition is shown in Table 1 so that each concentration of ZnS, CdS and PbS to $SiO_2$ was adjusted to 1 wt %. The mixture was stirred at room temperature for 1 hr and dried at 60° C. for 50 hours to gel. It was then heated in air at 450° C. for 1 hr to provide a Zn—Cd—Pb containing porous $SiO_2$ glass. It was further heated in $H_2S$ gas atmosphere at 300° C. for 10 min to provide a porous $SiO_2$ glass having fine particles of ZnS, CdS and PbS dispersed. The absorption spectrum of this glass had photo-absorption peaks due to the subbands of ZnS, CdS and PbS fine particles at 380 nm, 490 nm and 550 nm, respectively. The third order nonlinear optical susceptibilities measured by the forward degenerate four-wave mixing method were $1 \times 10^{-7}$ to $5 \times 10^{-7}$ esu at each absorption wavelength peak.

An $Al_2O_3$ matrix which had been formed using $Al(OC_2H_5)_3$ (30 g) instead of $Si(OC_2H_5)_4$ exhibited a property similar to that of the above $SiO_2$ glass matrix.

TABLE 1

| MATERIAL | FORMULATION (g) |
| --- | --- |
| $Si(OC_2H_5)_4$ | 30 |
| $C_2H_5OH$ | 40 |
| $H_2O$ | 30 |

Example 4

A solution of $Zn(NO_3)_2$ and $Cd(NO_3)_2$ in water was added to another sol whose composition is shown in Table 1 so that each concentration of ZnSe and CdSe to $SiO_2$ was adjusted to 1 wt %. The mixture was stirred at room temperature for 1 hr, dried at 60° C. for 50 hours to gel. It was then heated in air at 450° C. for one hour to provide a Zn—Cd containing porous $SiO_2$ glass. This glass was heated in $H_2Se$ gas atmosphere at 300° C. for 10 min to provide a porous $SiO_2$ glass having fine particles of ZnSe and CdSe dispersed therein. The absorption spectrum of the resulting glass had photo-absorption peaks due to the subbands of ZnSe and CdSe fine particles at 450 nm and 690 nm, respectively. The third order nonlinear optical susceptibilities measured by the forward degenerate four-wave mixing method were $3 \times 10^{-7}$ to $5 \times 10^{-7}$ esu at each absorption wavelength peak.

An $Al_2O_3$ matrix which had been formed using $Al(OC_2H_5)_3$ (30 g) instead of $Si(OC_2H_5)_4$ exhibited a property similar to that of the above $SiO_2$ glass matrix.

Example 5

$Zn(NO_3)_2$, $Cd(NO_3)_2$, $AuHCl_4$ and AgCl were added to still another sol whose composition is shown in Table 1 so that each concentration of ZnS, CdS, Au and Ag to $SiO_2$ was adjusted to 1 wt %. The mixture was stirred at room temperature for 1 hr, dried at 60° C. for 24 hours to gel. It was then heated in air at 400° C. for 1 hr to provide a porous $SiO_2$ glass comprising Zn and Cd, and fine particles of Au and Ag. This glass, comprising fine particles of Au and Ag formed by heat treatment, was further heated in $H_2S$ gas atmosphere at 300° C. for 10 min to provide a porous $SiO_2$ glass having fine particles of ZnS, CdS, Au and Ag dispersed therein. The absorption spectrum of the resulting glass had photo-absorption peaks due to the subbands of ZnS and CdS fine particles at 380nm and 490 run, respectively. On the other hand, photo-absorption spectrum peaks appeared at 525 nm and 400 nm, which were due to a respective surface plasmon absorption of Au fine particle and Ag fine particle. The third order nonlinear optical susceptibilities measured by the forward degenerate four-wave mixing method were $1 \times 10^{-7}$ to $5 \times 10^{-7}$ esu at each absorption wavelength peak.

Example 6

$Zn(NO_3)_2$ and $AuHCl_4$ were added to a sol whose composition is shown in Table 2 so that each concentration of ZnS and Au to $SiO_2$ was adjusted to 1 wt %. The mixture was stirred at room temperature for 1 hr and dried at room temperature for 7 days and at 60° C. for 24 hr to provide a 300 μm thick gel sheet of transparent and pale yellow. The silica gel thus formed was subjected to light irradiation with a 500 W xenon lamp at room temperature for 10 min. During the process the gel turned purplish red over time so as to confirm the formation of Au fine particle. Such photoreduction of $AuHCl_4$ never occurred without ethanol or ethylene glycol.

The mean particle diameter of Au fine particles produced by photoreduction was 3 nm, and the deviation was small. The absorption spectrum of this specimen had a photo-absorption peak at 525 nm due to the surface plasmon absorption of Au fine particle. The resulting Au—Zn containing porous $SiO_2$ glass was heated in $H_2S$ gas atmosphere at 100° C. for 10 min to provide a porous $SiO_2$ glass having ZnS fine particle dispersed therein. The third order nonlinear optical susceptibilities measured by the forward degenerate four-wave mixing method were $1 \times 10^{-7}$ and $6 \times 10^{-7}$ esu near the surface plasmon absorption wavelength of Au fine particle and the absorption subband of ZnS, respectively.

The above silica gel was subjected to light irradiation with a 500 W xenon lamp at room temperature for 10 min. During the process the gel turned purplish red over time so as to confirm the formation of Au fine particles. A porous $SiO_2$ glass comprising Au fine particles and Zn thus formed was heated in $H_2S$ gas atmosphere at 100° C. for 10 min to provide a porous $SiO_2$ glass comprising ZnS fine particle and Au fine particle dispersed therein. The third order nonlinear optical susceptibilities measured by the forward degenerate four-wave mixing method were $1 \times 10^{-7}$ and $5.8 \times 10^{-7}$ esu near the surface plasmon absorption wavelength of Au fine particle and the absorption subband of ZnS fine particle, respectively.

TABLE 2

| MATERIAL | FORMULATION (g) |
| --- | --- |
| $Si(OC_2H_5)_4$ | 30 |
| $C_2H_5OH$ | 20 |
| $HOCH_2CH_2OH$ | 20 |
| $H_2O$ | 30 |
| HCl | 1.0 |

The same specimen which had similarly been formed using $AuNaCl_4$ instead of $AuHCl_4$ confirmed the formation of Au fine particles, as well. Porous $SiO_2$ glasses comprising a fine particle of CdS or PbS dispersed were similarly made using $Cd(NO_3)_2$ or $Pb(NO_3)_2$ instead of $Zn(NO_3)_2$. An aluminum gel comprising Zn ion and Au ion was also formed using $Al(OC_2H_5)_3$ (30 g) instead of $Si(OC_2H_5)_4$ listed in Table 2.

Example 7

Zn(NO$_3$)$_2$ and AuHCl$_4$ were added to a sol whose composition is shown in Table 3 so that each concentration of ZnS and Au to SiO$_2$ was adjusted to 1 wt %. The mixture was stirred at room temperature for 1 hr and dried at room temperature for 7 days and at 60° C. for 24 hr to provide a 300 μm thick gel sheet of transparent and pale yellow. The addition of formamide as a drying control chemical additive to prevent a gel from cracking or foaming during drying permitted preparation of a relatively thick specimen. The silica gel thus formed was subjected to light irradiation with a 500 W xenon lamp at room temperature for ten minutes. During the process the gel turned purplish red over time so as to confirm the formation of Au fine particle. Such photoreduction of AuHCl$_4$ never occurred without ethanol or ethylene glycol.

The mean particle diameter of Au fine particles produced by photoreduction was 4 nm, and the deviation was small. The absorption spectrum of this specimen had a photo-absorption peak at 525 nm due to the surface plasmon absorption of Au fine particle. The resulting Au—Zn containing porous SiO$_2$ glass was heated in H$_2$S gas atmosphere at 100° C. to provide a porous SiO$_2$ glass having ZnS fine particle dispersed therein. The third order nonlinear optical susceptibilities measured by the forward degenerate four-wave mixing method were $1.2 \times 10^{-7}$ and $6.7 \times 10^{-7}$ esu near the surface plasmon absorption wavelength of Au fine particles and the absorption subband of ZnS, respectively.

The same specimen which had similarly been formed using AuNaCl$_4$ instead of AuHCl$_4$ confirmed the formation of Au fine particles, as well. Porous SiO$_2$ glasses comprising a fine particle of CdS or PbS dispersed were similarly made using Cd(NO$_3$)$_2$ or Pb(NO$_3$)$_2$ instead of Zn(NO$_3$)$_2$.

TABLE 3

| MATERIAL | FORMULATION (g) |
| --- | --- |
| Si(OC$_2$H$_5$)$_4$ | 30 |
| C$_2$H$_5$OH | 20 |
| HOCH$_2$CH$_2$OH | 20 |
| HCONH$_2$ | 10 |
| H$_2$O | 30 |
| HCl | 1.0 |

Example 8

AuHCl$_4$ and AgClO$_4$ were added to a sol whose composition is shown in Table 4 so that each concentration of Au and Ag to SiO$_2$ was adjusted to 1 wt %. The mixture was stirred at room temperature for 1 hr and dried at room temperature for 5 days and at 60° C. for 24 hr to provide a 300 μm thick gel sheet of transparent and pale yellow.

When Ce$^{3+}$ derived from Ce(NO$_3$)$_3$ changed into Ce$^{4+}$ upon light irradiation, electrons released from Ce$^{3+}$ likely facilitated the reduction of AuHCl$_4$, since the period of reduction time was reduced.

The silica gel sheet thus formed was subjected to light irradiation with a 500 W xenon lamp at room temperature for 3 min. During the process the gel turned purplish red over time so as to confirm the formation of Au fine particles. AuHCl$_4$ was readily photoreduced sooner than that of another sheet prepared using a Ce(NO$_3$)$_3$-free sol. Such photoreduction of AuHCl$_4$ never occurred without ethanol or ethylene glycol.

The absorption spectrum of this specimen had photoabsorption peaks at 527 and 402 nm due to the surface plasmon absorption of Au fine particle and Ag fine particle. The third order nonlinear optical susceptibilities measured by the forward degenerate four-wave mixing method were $1.1 \times 10^{-7}$ and $1.0 \times 10^{-7}$ esu at each surface plasmon absorption wavelength.

TABLE 4

| MATERIAL | FORMULATION (g) |
| --- | --- |
| Si(OC$_2$H$_5$)$_4$ | 30 |
| C$_2$H$_5$OH | 20 |
| HOCH$_2$CH$_2$OH | 20 |
| Ce(NO$_3$)$_3$ | 5 |
| H$_2$O | 30 |
| HCl | 1.0 |

Example 9

A quartz substrate was soaked in a sol whose composition is shown in Table 3 for 1 min and dried at 60° C. for 1 hr to gel so as to provide a 0.3 μm thick SiO$_2$ thin film. The substrate with the SiO$_2$ thin film was further soaked in another sol for 1 min to provide a 0.3 μm thick Zn—Au containing film. The sol was prepared by mixing a sol whose composition is shown in Table 2 with Zn(NO$_3$)$_2$ and AuHCl$_4$ so that each concentration of ZnS and Au to SiO$_2$ was adjusted to 1 wt %. The above two soaking steps were repeatedly carried out 4 more times to provide an about 3 μm thick film which was a metal fine particle-dispersed material having metal fine particle layers and glass layers alternately deposited.

The silica gel sheet thus formed was subjected to light irradiation with a 500 W xenon lamp at room temperature for 10 min. During the process the gel turned purplish red over time so as to confirm the formation of Au fine particles. Such photoreduction of AuHCl$_4$ never occurred without ethanol or ethylene glycol.

The mean particle diameter of Au fine particles produced by photoreduction was 3 nm, and the deviation was small. The absorption spectrum of this specimen had a photo-absorption peak at 520 nm due to the surface plasmon absorption of Au fine particle. The resulting Au—Zn containing porous SiO$_2$ glass was heated in H$_2$S gas atmosphere at 100° C. for 10 min to provide a porous SiO$_2$ glass having ZnS fine particle dispersed therein. The third order nonlinear optical susceptibilities of this thin film measured by the forward degenerate four-wave mixing method were $1.2 \times 10^{-7}$ esu at surface plasmon absorption wavelength of Au fine particle and $6.7 \times 10^{-7}$ esu near the absorption subband of ZnS.

The same specimen which had similarly been formed using AuNaCl$_4$ instead of AuHCl$_4$ confirmed the formation of Au fine particles, as well. A porous SiO$_2$ glass comprising fine particles of CdS and PbS dispersed was similarly made using Cd(NO$_3$)$_2$ and Pb(NO$_3$)$_2$ instead of Zn(NO$_3$)$_2$.

Further, a respective metal fine particle-dispersed material was similarly made using either H$_2$PtCl$_6$, AgClO$_4$, RhCl$_3$ or PdCl$_2$ instead of the Au compounds. Each third order nonlinear optical susceptibility of the thin films was in the range from 10$^{-8}$ to 10$^{-7}$ esu.

Example 10

AuHCl$_4$ and AgClO$_4$ were added to a sol whose composition is shown in Table 4 so that each concentration of Au and Ag to $SiO_2$ was adjusted to 1 wt %. The mixture was stirred at room temperature, dried at room temperature for 5 days and at 60° C. for 24 hr to provide a 300 μm thick sheet.

The resulting silica gel sheet was subjected to light irradiation with a 500 W xenon lamp at room temperature for 3 min so that the gel turned deep purple. Such change of color never occurred without ethanol.

The absorption spectrum of this specimen had photo-absorption peaks at 520 and 402 nm due to the surface plasmon absorption of Au fine particle and Ag fine particle, respectively. The third order nonlinear optical susceptibilities measured by the forward degenerate four-wave mixing method were $1.1 \times 10^{-7}$ and $1.0 \times 10^{-7}$ esu at each surface plasmon absorption wavelength.

Example 11

Fine particles of ZnS, CdS, PbS, Au and Ag were dispersed in a 0.2 mm thick AS resin (an acrylonitrile-styrene copolymer) as follows.

To the AS resin (50 g) were added $Zn(NO_3)_2$, $Cd(NO_3)_2$, $AuHCl_4$ and AgCl, and further $NaBH_4$ as a reducing agent so that each concentration of ZnS, CdS, PbS, Au and Ag to the resin was adjusted to 1 wt %. The mixture was stirred at room temperature for 1 min, dried at 80° C. and further heated in $H_2S$ gas atmosphere at 50° C. for 10 min to provide an AS resin comprising fine particles of ZnS, CdS, PbS, Au and Ag.

The absorption spectrum of this resin had photo-absorption peaks at 380, 490 and 550 nm due to the subbands of fine particles of ZnS, CdS and PbS, respectively. Peaks also appeared at 525 and 410 nm due to the surface plasmon absorption of Au fine particle and Ag fine particle, respectively. The third order nonlinear optical susceptibilities measured by the forward degenerate four-wave mixing method were $1 \times 10^{-7}$ and $7 \times 10^{-7}$ esu at each surface plasmon absorption wavelength.

Like metal fine particle-dispersed films were made using as a matrix polymer either polystyrene, polyethylene, polypropylene, polyester, polyamide or poly(methyl methacrylate), instead of AS resin.

Example 12

An optical bistable device was formed using the material prepared with the method of Example 1. Laser light with wavelengths of 525, 400 and 575 nm was incident on the 5 μm diameter spot of the device, and the relation of intensities between the incoming light and the outgoing light was measured at room temperature (25° C.). The device was found to exhibit a bistable property at each wavelength.

Example 13

Another optical bistable device was formed using the material prepared with the method of Example 10. Laser light with wavelengths of 525 and 400 nm was incident on the 5 μm diameter spot of the device, and the relation of intensities between the incoming light and the outgoing light was measured at room temperature (25° C.). The device was found to exhibit a bistable property at each wavelength.

As stated above, the invention provides the nonlinear optical material which exhibits large third order nonlinear optical susceptibilities and responds to light with wavelengths different from each other for multiple signal processing. This is effectively accomplished by dispersing a metal fine particle selected from the group consisting of gold, platinum, silver, copper, rhodium, palladium and iridium and/or a semiconductor fine particle selected from the group consisting of ZnS, CdS, ZnSe, CdSe, PbS and CuCl throughout a glass matrix, a ceramic matrix or a polymer matrix. When the polymer is one selected from polystyrene, polyethylene and acrylonitrile-styrene copolymer, the resulting material is easy to form in a thin film useful as a nonlinear optical material.

The methods of the invention provide such materials readily and effectively by dispersing many kinds of metal fine particles and semiconductor fine particles uniformly in the matrix.

The invention may be embodied in other specific forms without departing from the spirit or essential characteristics thereof. The disclosed embodiments are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A nonlinear optical material comprising an optically transparent matrix and at least two kinds of fine particles dispersed therein, said optically transparent matrix having no photo-absorption in the wavelength region of photo-absorption of said fine particles, wherein said fine particles are at least one semiconductor fine particle and at least one metal fine particle and said fine particles exhibit a third order nonlinear optical effect upon absorbing light of different wavelengths.

2. A nonlinear optical material comprising an optically transparent matrix and at least two kinds of semiconductor fine particles dispersed therein, said optically transparent matrix having no photo-absorption in the wavelength region of photo-absorption of said fine particles, wherein said semiconductor fine particles exhibit a third order nonlinear optical effect upon absorbing light of different wavelengths.

3. A nonlinear optical material according to claim 2, wherein said semiconductor fine particles are made of at least one compound selected from the group consisting of ZnS, CdS, ZnSe, CdSe, PbS and CuCl.

4. A nonlinear optical material according to claim 2, wherein said optically transparent matrix is made of inorganic glass or ceramic.

5. A nonlinear optical material according to claim 2, wherein said optically transparent matrix is made of at least one polymer selected from the group consisting of polystyrene, polyethylene and acrylonitrile-styrene copolymer.

6. A method of manufacturing a nonlinear optical material, comprising the steps of mixing a component for producing borosilicate glass with at least two materials each being selected from the group consisting of a semiconductor and a combination of a metal compound and a reducing agent, melting, quenching rapidly and heating the mixture.

7. A method of manufacturing a nonlinear optical material, comprising the steps of mixing a solution of an alkoxide with at least two kinds of metal ions, gelling the mixture and subjecting the mixture to a reduction to form a metal fine particle and a treatment with $H_2S$ or $H_2Se$ to form a semiconductor fine particle.

8. A method according to claim 7, wherein the mixture is reduced by heating to form a metal fine particle.

9. A method according to claim 7, wherein the mixture is reduced by heating to form a metal fine particle and reacted with $H_2S$ or $H_2Se$ to form a semiconductor fine particle.

10. A method according to claim 7, wherein the mixture is photoreduced by light irradiation and treated with an alcohol to form a metal fine particle.

11. A method according to claim 7, wherein the mixture is photoreduced by light irradiation and treated with an alcohol and $Ce^{3+}$ to form a metal fine particle.

12. A method according to claim 7, wherein the mixture is photoreduced by light irradiation and treated with an alcohol to form a metal fine particle and reacted with $H_2S$ or $H_2Se$ to form a semiconductor fine particle.

13. A method according to claim 7, wherein the mixture is photoreduced by light irradiation at a wavelength of 400 nm or less.

14. A method of manufacturing a nonlinear optical material, comprising the steps of mixing a polymer with at least two kinds of metal ions, gelling the mixture and subjecting the mixture to a reduction to form a metal fine particle and a treatment with $H_2S$ or $H_2Se$ to form a semiconductor fine particle.

15. A method according to claim 14, wherein the mixture is reduced by heating to form a metal fine particle.

16. A method according to claim 14, wherein the mixture is reduced by heating to form a metal fine particle and reacted with $H_2S$ or $H_2Se$ to form a semiconductor fine particle.

17. A nonlinear optical material comprising an optically transparent matrix and at least two kinds of metal fine particles dispersed therein, said optically transparent matrix having no photo-absorption in the wavelength region of photo-absorption of said fine particles, wherein said metal fine particles exhibit a third order nonlinear optical effect upon absorbing light of different wavelengths.

18. A nonlinear optical material according to claim 17, wherein said fine particles are a metal fine particle made of at least one element selected from the group consisting of gold, platinum, silver, copper, rhodium, palladium and iridium.

19. A method of manufacturing a nonlinear optical material, comprising the steps of mixing a solution of an alkoxide with at least two kinds of metal ions, gelling the mixture and subjecting the mixture to a reduction to form metal fine particles.

* * * * *